(12) United States Patent
Wang

(10) Patent No.: US 7,543,557 B2
(45) Date of Patent: Jun. 9, 2009

(54) SCUFF RESISTANT ALUMINUM PISTON AND ALUMINUM CYLINDER BORE COMBINATION AND METHOD OF MAKING

(75) Inventor: Yucong Wang, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 188 days.

(21) Appl. No.: 11/218,050

(22) Filed: Sep. 1, 2005

(65) Prior Publication Data

US 2007/0234994 A1 Oct. 11, 2007

(51) Int. Cl.
*F16J 1/04* (2006.01)
(52) U.S. Cl. ............... 123/193.6; 123/193.1; 123/193.3; 123/193.4
(58) Field of Classification Search ............... 123/193.6, 123/193.1, 193.2, 193.4
See application file for complete search history.

(56) References Cited

U.S. PATENT DOCUMENTS

| | | | | |
|---|---|---|---|---|
| 3,945,893 A | * | 3/1976 | Ishimori et al. | 205/109 |
| 4,885,213 A | * | 12/1989 | Miyamoto et al. | 428/612 |
| 5,884,600 A | * | 3/1999 | Wang et al. | 123/193.6 |
| 5,891,273 A | * | 4/1999 | Ruckert et al. | 148/523 |
| 6,684,844 B1 | | 2/2004 | Wang et al. | |
| 6,817,333 B2 | * | 11/2004 | Wang et al. | 123/193.2 |
| 2004/0045521 A1 | * | 3/2004 | Wang et al. | 123/193.1 |
| 2004/0265163 A1 | | 12/2004 | Doty | |

* cited by examiner

*Primary Examiner*—M. McMahon

(57) ABSTRACT

A piston and cylinder assembly for an engine is disclosed. The assembly includes a piston including an aluminum alloy piston body having a crown and a skirt extending from the crown. The skirt has an exterior surface having a surface finish in a wave form with peaks and valleys, and having a roughness total between approximately 6 and 12 micrometers, the roughness total (Rt) being defined as the difference between the highest peak and lowest valley within an assessment length. The surface finish has an approximate peak-to-peak distance between 0.17 and 0.25 millimeters within the assessment length. The exterior surface is coated with a nickel ceramic composite coating. An aluminum alloy cylinder bore is disposed in an engine block and is configured to receive the piston body. The cylinder bore has a bore surface having a roughness average (Ra) between approximately 0.09 and 0.25 micrometers. The cylinder bore may be made of a eutectic Al—Si alloy including other alloying elements.

11 Claims, 3 Drawing Sheets

| Group Name | Test # | Scuffing Load(N) | Average Load(N) |
|---|---|---|---|
| NR-PEAK | 1 | 700 | 700 |
| | 2 | 700 | |
| | 3 | 700 | |
| | 4 | 700 | |
| NS-PEAK | 1 | 800 | 825 |
| | 2 | 900 | |
| | 3 | 800 | |
| | 4 | 800 | |
| NR-390 | 1 | 600 | 650 |
| | 2 | 700 | |
| | 3 | 700 | |
| | 4 | 600 | |
| NS-390 | 1 | 800 | 800 |
| | 2 | 800 | |
| | 3 | 800 | |
| | 4 | 800 | |
| NR-WEAR RESISTANT ALLOY | 1 | 1400 | 1150 |
| | 2 | 1300 | |
| | 3 | 1500 | |
| | 4 | 1000 | |
| | 5 | 800 | |
| | 6 | 900 | |
| NS-WEAR RESISTANT ALLOY | 1 | 1400 | 1300 |
| | 2 | 1600 | |
| | 3 | 1500 | |
| | 4 | 700 | |
| | 5 | 1300 | |
| | 6 | 1300 | |
| NS-WEAR RESISTANT ALLOY Second Run | 7 | 1550 | 1593 |
| | 8 | 1650 | |
| | 9 | 1450 | |
| | 10 | 1600 | |
| | 11 | 1700 | |
| | 12 | 1700 | |
| | 13 | 1500 | |

*FIG. 3*

SCUFF RESISTANT ALUMINUM PISTON AND ALUMINUM CYLINDER BORE COMBINATION AND METHOD OF MAKING

TECHNICAL FIELD

This invention relates to aluminum pistons and aluminum cylinder bores for vehicle internal combustion engines, and more particularly to aluminum piston and cylinder bore combinations having improved scuffing resistance.

BACKGROUND OF THE INVENTION

It is known in the art relating to internal combustion engines that aluminum bore engines can provide benefits such as improved fuel economy due to the lighter weight of aluminum engines and better engine performance and reliability due to reduced bore distortion and improved heat transfer through aluminum cylinder bores. Aluminum bore engines also allow tighter clearance between piston and cylinder bore, leading to a reduction in engine noise and oil consumption. When aluminum materials are used for both the piston and the cylinder bore, however, scuffing resistance between pistons and cylinder bores becomes a significant issue. Scuffing resistance is of further importance in aluminum bore engines because of the tighter clearances allowed between aluminum pistons and bores.

Scuffing is an adhesive wear process that occurs when two parts slide against each other in a lubricant starved condition. Scuffing between pistons and cylinder bores is problematic as it may lead to decreased engine performance and may cause engine failure. A current aluminum piston skirt, machined with a single diamond point in a continuous cut, typically has a wavy surface with peaks and valleys. Roughness total (Rt) is a characteristic of piston skirts defined as the distance from the highest peak to the lowest valley measured over a specified length of the piston skirt. A current aluminum piston skirt may have a roughness total of between 13 and 19 microns. Further, a current piston skirt may typically have a distance between peaks of 0.32-0.79 mm (320-790 microns). Conventionally, to improve scuffing resistance between pistons and cylinder bores, piston skirts are coated with a coating material that provides scuffing resistance. The conventional piston skirt coating process involves coating the piston skirt without altering the conventional roughness total of the piston skirt or the distance between peaks. In fact, it has been commonly believed that reducing the surface roughness of the piston skirt (lowering the roughness total and the distance between peaks) is ineffective in improving scuffing resistance, and may even hinder scuffing resistance.

U.S. Pat. No. 6,684,844 B1 discloses the results of earlier work for the assignee of the present invention pertaining to improved scuffing resistance of an improved coated aluminum piston operated in a cast-iron cylinder bore. Development of an optimum aluminum cylinder bore treatment and material for use with the improved piston to obtain improved wear and scuffing resistance was desired.

SUMMARY OF THE INVENTION

The present invention utilizes a recently developed aluminum alloy for engine blocks disclosed in U.S. Patent Application Publication US 2004/0265163 A1 published Dec. 30, 2004. The new alloy provides good castability, improved tensile strength, and improved resistance to wear and piston/cylinder scuffing. Comparative testing with other aluminum engine materials confirmed the improved results of the new material. However, further development was needed to optimize the bore and surface conditions, and the methods for obtaining them, to maximize the resistance to wear and scuffing of the new combination.

The present invention utilizes an unconventionally "smooth" piston skirt surface finish coated with a composite coating in combination with an unconventionally "smooth" cylinder bore surface finish. In a specific embodiment, a piston and cylinder assembly for an engine according to the present invention includes a piston including an aluminum piston body having a crown and a skirt extending from the crown. The skirt has an exterior surface. The exterior surface has a surface finish in a wave form with peaks and valleys, and has a roughness total between approximately 6 and 12 micrometers, preferably 10 micrometers. The roughness total (Rt) is defined as the difference between the highest peak and lowest valley within an assessment length. The surface finish has an approximate peak-to-peak distance between 0.17 and 0.25 millimeters, preferably 0.20 millimeters, within the assessment length. The exterior surface of the piston skirt is coated with a composite coating, such as a Ni—P—BN ceramic composite coating. The assembly further includes an aluminum cylinder bore disposed in an engine block. The cylinder bore is configured to receive the piston body. The cylinder bore has a bore surface, the bore surface having a roughness average (Ra) between approximately 0.09 and 0.25 micrometers, preferably 0.09 to 0.12 micrometers.

The cylinder bore may be made of a eutectic Al—Si alloy including other alloying elements. The aluminum alloy may include, by weight, 9.5 to 12.5% silicon, 0.1 to 1.5% iron, 1.5 to 4.5% copper, 0.2 to 3% manganese, 0.1 to 0.6% magnesium, 2.0% maximum zinc, 0 to 1.5% nickel, 0.25% maximum titanium, up to 0.05% strontium, and aluminum. The weight ratio of manganese to iron is at least 1.2 when the iron content is equal to or greater than 0.4% and the weight ratio of manganese to iron is at least 0.6 when the iron content is less than 0.4% of the alloy.

A method of preparing an aluminum piston and aluminum cylinder assembly for use in an engine is disclosed, wherein the piston includes a piston body having a crown and a skirt, the skirt extends from the crown and has an exterior surface, and the cylinder is a cylinder bore configured to receive the piston body and has a bore surface. The method includes the steps of machining the exterior surface of the piston skirt such that the finish of the exterior surface has a wave form with peaks and valleys, a roughness total (Rt) between approximately 6 and 12 micrometers, the roughness total being defined as the difference between the highest peak and lowest valley within an assessment length, and an approximate peak-to-peak distance between 0.17 and 0.25 millimeters within the assessment length; coating the machined exterior surface of the piston skirt with a nickel ceramic composite plating; rough honing the bore surface with a diamond abrasive; final honing the bore surface with a fine grit abrasive; and finishing the bore surface, wherein the finished bore surface has a roughness average (Ra) between approximately 0.09 and 0.25 micrometers.

These and other features and advantages of the invention will be more fully understood from the following description of certain specific embodiments of the invention taken together with the accompanying drawings.

DESCRIPTION OF THE DRAWINGS

FIG. 3 is a table illustrating the scuffing resistance of tested aluminum piston and aluminum cylinder bore combinations.

DESCRIPTION OF AN EXEMPLARY EMBODIMENT

Figure 1:
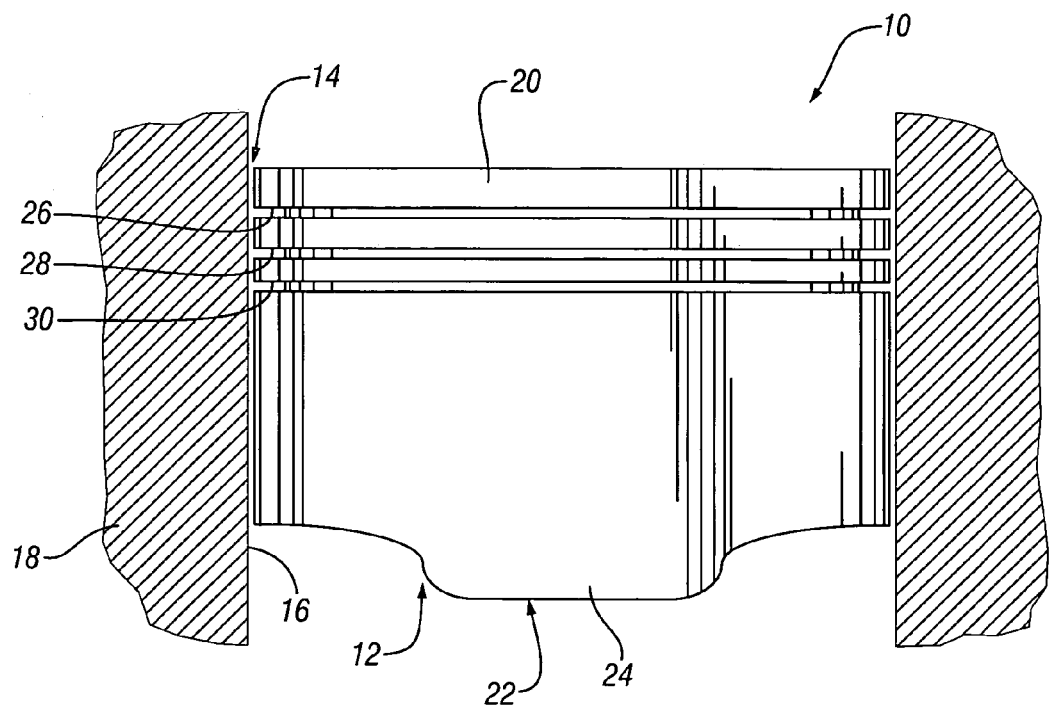
FIG. 1 is a side partial cross-sectional view of a piston disposed within a cylinder bore in accordance with the present invention.

FIG. 1 illustrates a piston and cylinder assembly 10 for use in an internal combustion engine such as a vehicle engine. The piston and cylinder assembly 10 includes an aluminum piston 12 that is reciprocable within a cylinder bore 14 defined by an annular bore surface 16 in an aluminum engine block 18.

The piston 12 includes a crown 20 and a skirt 22 extending from the crown 20. The skirt 22 has an exterior surface 24. A plurality of ring grooves 26, 28, 30 are formed in the crown 20 to receive rings such as compression rings and an oil ring (not shown).

Figure 2:
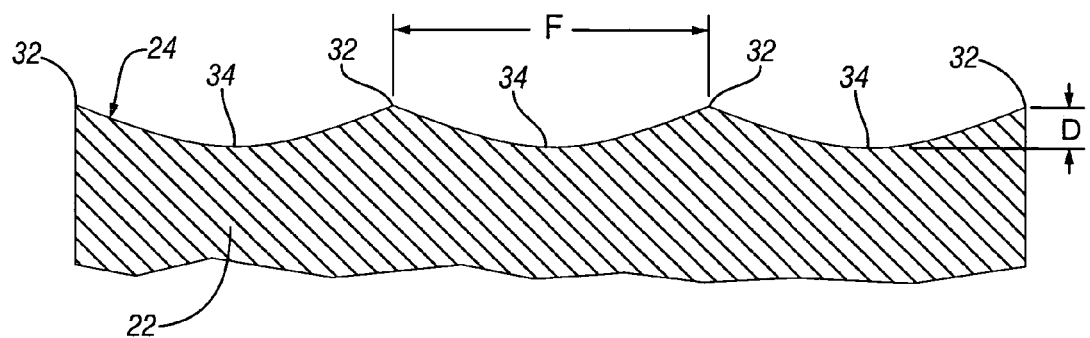
FIG. 2 is an enlarged schematic cross-sectional view illustrating a surface finish of a piston skirt.

FIG. 2 generally illustrates a cross-sectional view of a machined piston skirt surface 24 of a skirt 22. The piston skirt surface 24 is machined by traversing the length of the skirt 22 with, for example, a turning machine that is operated by computer numeric control (CNC). For purposes of example, the machine may utilize a single diamond tipped insert to perform the machining process. The machining process results in a piston skirt surface 24 that has a wave form with peaks 32 and valleys 34. The dimension F represents the peak-to-peak distance of the wave form, and is defined by the transverse feed rate (in mm/revolution) of the turning operation by which the skirt surface 24 is machined. One revolution of the machine leads to the formation of one complete wave. For example, conventional pistons are machined with a transverse feed rate between 0.32 and 0.79 mm per revolution, resulting in a peak-to-peak distance (F) between 0.32 and 0.79 mm.

The dimension D represents the difference between the highest peak and lowest valley within an assessment length. The "assessment length" is the evaluation length and is typically equal to five times the cut-off length. It is the amount of material used for measuring the surface characteristics of a machine component. The dimension D is also referred to as roughness total (Rt). Roughness total (Rt) is typically measured in microns (μm). Conventional pistons usually have a roughness total (Rt) in the range of 13 to 19 microns. A similar measured property is the surface roughness average (Ra). Roughness average (Ra) is defined as the arithmetic average distance of a roughness profile (points on the wave form) from its mean line (the mean "height" of the wave form). The cut-off length used to determine the "assessment length" above is typically 0.8 mm for a surface having a roughness average (Ra) between 0.1 and 2 micrometers.

The roughness of the cylinder bore 14 may also be measured by the roughness average (Ra). Conventionally, cylinder bores are finished to a roughness average between 0.58 and 0.90 micrometers. The roughness of the cylinder bore may further be measured by a reduced peak height (Rpk) and a reduced valley depth (Rvk). Rpk is defined as the distance from a mean height of the bore surface 16 to a peak in the bore surface. This defines the top portion of the bearing surface which will be worn away during a running-in period. Similarly, Rvk is defined as the distance from the mean height to a valley of the bore surface 16. This defines the lowest part of the surface which has the function of retaining lubricant. The cylinder bore surface 16 should have a certain amount of roughness to retain oil, but also must provide a relatively flat surface area to support the piston rings.

The present invention provides for improved scuffing resistance for an aluminum piston 12 received in an aluminum cylinder bore 14 without the use of cylinder liners or wear resistant cylinder coatings. The scuffing resistance for aluminum piston and cylinder assemblies results from a specific surface finish for the cylinder bore 14 and a specific surface texture for the exterior surface 24 of the piston skirt 22, along with a nickel-ceramic composite (NCC) coating on the exterior piston skirt surface 24. More particularly, the improved scuffing resistance is achieved by combining an unconventionally "smooth," NCC coated aluminum piston skirt surface 24 with an unconventionally "smooth" aluminum cylinder bore 14.

Specifically, the piston skirt 22 of the present invention includes an exterior surface 24 having a roughness total (Rt) between approximately 6 and 12 micrometers, preferably 10 micrometers. The exterior surface 24 also has a distance between peaks (F) of between 0.17 and 0.25 millimeters, preferably 0.20 millimeters, which corresponds to smaller transverse feed rate during machining than conventionally used to machine piston skirts. The piston skirt surface 24 is significantly smoother than conventional piston skirts, which have a roughness total (Rt) between 13 and 19 micrometers and a peak-to-peak distance of between 0.32 and 0.79 millimeters.

The exterior surface 24 of the machined piston skirt 22 is coated with a composite coating such as a nickel ceramic composite coating. The nickel ceramic composite coating may be, for example, a Ni—P—BN (nickel-phosphorous-boron nitride) plated coating including approximately 3-7% by volume BN and approximately 3% by weight phosphorous. The coating may be applied by conventional electroplating processes with suspended ceramic particulate in the electroplating solution which is co-deposited during plating. The BN particulate is 4 micrometers in diameter and less than 1 micron in thickness. The NCC coating may have a thickness of 10 to 18 micrometers and a hardness of approximately 47-50 HRC.

In a preferred embodiment, the piston skirt 22 has a roughness total (Rt) of 10 micrometers and a peak-to-peak distance (F) of 0.2 millimeters. Further, the piston skirt 22 is coated with a Ni—P—BN plated coating including 6% by volume BN. The Ni—P—BN coating has a thickness of 16 micrometers and a microhardness of 48 HRC.

The engine block 18 and correspondingly the cylinder bore 14 of the present invention may be made of a eutectic Al—Si alloy including other alloying elements such as iron, copper, manganese, etc. One suitable aluminum alloy found in U.S. Patent Application Publication US2004/0265163 includes, by weight, 9.5 to 12.5% silicon, 0.1 to 1.5% iron, 0.2 to 3% manganese, 0.1 to 0.6% magnesium, up to 0.05% strontium, and aluminum. The weight ratio of manganese to iron is at least 1.2 when the iron content is equal to or greater than 0.4% and the weight ratio of manganese to iron is at least 0.6 when the iron content is less than 0.4% of the alloy. The alloy may further include, by weight, 1.5 to 4.5% copper, 2.0% maximum zinc, 0 to 1.5% nickel, and 0.25% maximum titanium. A preferred composition, by weight, includes 11.25 to 11.75% silicon, 0.35 to 0.65% iron (may be higher for die cast block), 1.75 to 2.75% copper, 0.4 to 3% manganese (at least 1.2 to 1.5 times the iron content), 0.15 to 0.3% magnesium, 0.5% maximum zinc, a trace of nickel, 0.01 to 0.03% strontium, up to but less than 0.5% total of other elements, and the balance aluminum. This eutectic Al—Si alloy will hereinafter be referred to as the "wear resistant alloy."

In a specific embodiment, the wear resistant alloy has the following composition: 11.6% silicon, 0.41% iron, 2.00% copper, 0.56% manganese, 0.25% magnesium, 0.02% strontium, 0.01% chromium, 0.01% nickel, 0.01% zinc, and 0.123% titanium.

The wear resistant alloy provides the fluidity of an aluminum-silicon eutectic alloy. The alloy can be cast into an engine block 18 by any of the common casting methods, such as die casting (which may require higher iron content), permanent mold casting, semi-permanent mold casting, bonded sand casting, lost foam casting, and precision sand casting. When the Mn/Fe content is controlled as specified, the tensile strength of the cast material is as high as 320 MPa, which is more than 20% greater than the tensile strength of similar alloys in which the manganese to iron content is not controlled to such values.

When cast, the microstructure of the wear resistant alloy has a web-like pattern of intermetallic phases. The intermetallic phases include, for example, a $CuAl_2$ phase, an $Al_{12}(Fe, Mn)_3Si_2$ phase, and an $Al_5Mg_8Cu_2Si_6$ phase. The web-like microstructure of the wear resistant alloy exhibits a significant amount of strength compared to other aluminum alloys. Further, when the wear resistant alloy is used in an engine cylinder block 18, the web-like structure is present throughout the cylinder block, even at the cylinder bore surface 16. This results in the cylinder bore surface 16 having a high wear resistance from intermetallic phases, thereby eliminating the need for a separate cylinder bore liner.

Engine block castings of the wear resistant alloy composition are suitably machinable for engine block manufacture and finishing. The castings have low porosity levels, typically under one percent by volume. Further, the material is resistant to piston/ring scuffing and other sources of cylinder block wear. Moreover, as stated above, the wear resistant alloy displays suitable wear resistance and durability during engine operation so that separate cylinder liners, such as iron liners and hypereutectic Al—Si liners, are not required in cylinder bores of blocks made of this alloy.

The cylinder bore surface 16 of the present invention is finished to have a roughness average (Ra) of between approximately 0.09 and 0.25 micrometers, preferably 0.09 to 0.12 micrometers. This is much smoother than other cylinder bore surfaces, which typically have a roughness average (Ra) at least between 0.34 and 0.52 and sometimes greater than 0.52. The cylinder bore surface 16 also should have a reduced peak height (Rpk) in the range of approximately 0.05 and 0.25 micrometers and a reduced valley depth (Rvk) in the range of approximately 0.15 and 0.40 micrometers.

The cylinder bore surface 16 may be prepared to the desired smoothness by honing and then brushing. Computer numerically controlled honing machines are used to operate the honing tools to achieve high quality bore finishes. The cylinder bore surface 16 may first be rough honed with a diamond abrasive, such as a diamond particle embedded stone, to within approximately 0.125 mm of the final bore size. Diamond tends to leave torn and folded metal on the bore surface 16, causing a smeared appearance that does not make a good bore finish. Consequently, the cylinder bore surface 16 may be final honed with a fine grit abrasive such as a fine grit silicon carbide stone. The fine grit abrasive is used to shave off the peaks, or to sweep across the surface 16 to remove jagged peaks as well as folded and torn material, and to hone to the final bore size. The cylinder bore surface 16 may then be finished by brushing the surface. The brushing may be accomplished with, for example, a flexible brush or a nylon bristle honing tool. The brushes may have mono-filament strands that are extrusion-molded with a fine abrasive material embedded in the strands. Brushing helps to further remove torn and folded debris while also improving the overall surface finish. After the finishing process, hard intermetallic phases of the aluminum alloy may protrude between approximately 1 and 3 micrometers from the bore surface 16.

Figure 4:
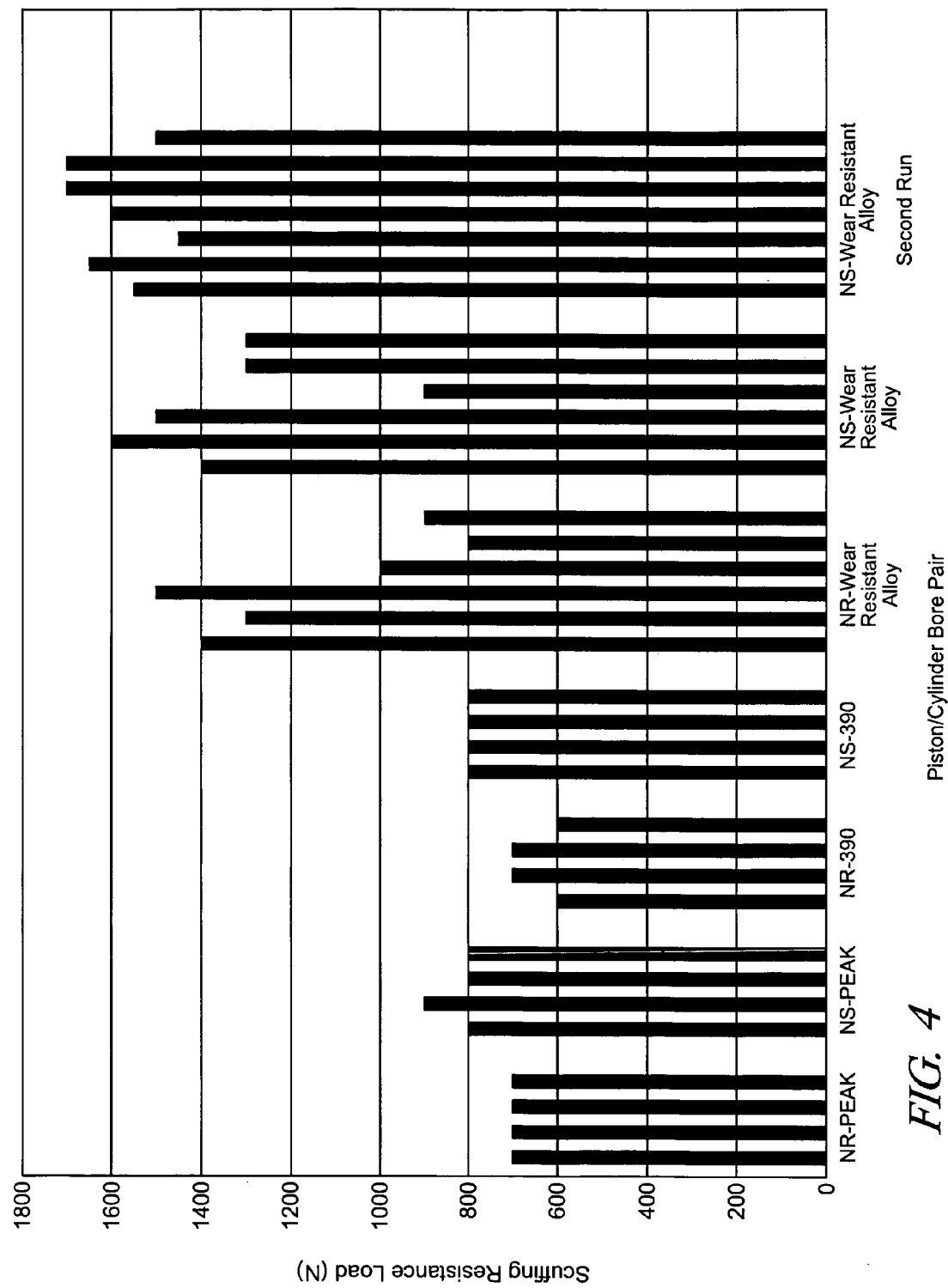
FIG. 4 is a graph of the data represented in FIG. 3.

Turning to FIGS. 3 and 4, a Ni—P—BN coated rough piston skirt and a Ni—P—BN coated smooth piston skirt were tested against three different aluminum cylinder bores to determine the load (in N) to scuffing (i.e., scuff resistance). A rough piston skirt (denoted as "NR") had the exterior surface characteristics of conventional piston skirts as described above and a smooth piston skirt (denoted as "NS") had the exterior surface characteristics of the present invention as described above. The three aluminum cylinder bores were a PEAK alloys cylinder bore (denoted as "PEAK"), a 390 Al cylinder bore (denoted as "390"), and a cylinder bore made of the wear resistant alloy. The tests were conducted on a piston/cylinder bore scuffing test apparatus.

The test results show that an aluminum cylinder bore in combination with a smooth, NCC coated piston skirt of an aluminum piston provides improved scuffing resistance over smooth aluminum cylinder bores in combination with rough, NCC coated pistons. This can be seen by comparing the results for the NR-PEAK group with the NS-PEAK group, the NR-390 group with the NS-390 group, and the NR-wear resistant alloy group with the NS-wear resistant alloy group. The NS-PEAK group had an average scuffing load of 825 N compared to an average scuffing load of 700 N for the NR-PEAK group. The NS-390 group had an average scuffing load of 800 N compared to an average scuffing load of 650 N for the NR-390 group. The NS-wear resistant alloy group had an average scuffing load of 1300 N for the first set of test runs and 1593 N for the second set of test runs compared to an average scuffing load of 1150 N for the NR-wear resistant alloy group. Two sets of test runs were conducted for the NS-wear resistant alloy group because of the large variation in results obtained in the first set of test runs. The large variation in results for the first set of runs may have been caused by casting porosity in the wear resistant alloy cylinder bore.

The test results further show that a wear resistant alloy cylinder bore finished according to the present invention in combination with a smooth, Ni—P—BN coated piston skirt provides significantly more scuffing resistance than other aluminum cylinder bores. This is apparent from the difference in scuffing load for the NS-wear resistant alloy group compared to the NS-PEAK group and the NS-390 group. The NS-PEAK group and NS-390 group had average scuffing loads of 825 N and 800 N respectively, while the NS-wear resistant alloy group had an average scuffing load of 1300 N for the first set of test runs and 1593 N for the second set of test runs.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A piston and cylinder assembly for an engine, the assembly comprising:
   a piston including an aluminum piston body having a crown and a skirt extending from the crown, the skirt having an exterior surface;
   the exterior surface having a surface finish in a wave form with peaks and valleys, and having a roughness total between approximately 6 and 12 micrometers, the roughness total (Rt) being defined as the difference between the highest peak and lowest valley within an assessment length;

the surface finish having an approximate peak-to-peak distance between 0.17 and 0.25 millimeters within the assessment length;

a nickel ceramic composite (NCC) coating applied directly on the exterior surface of the skirt; and an aluminum alloy cylinder bore disposed in an engine block and configured to receive the piston body, the cylinder bore having a bore surface;

wherein hard intermetallic phases of the aluminum alloy protrude between approximately 1 and 3 micrometers from the bore surface;

the bore surface having a roughness average (Ra) between approximately 0.09 and 0.25 micrometers.

2. The piston and cylinder assembly of claim 1, wherein the bore surface has a roughness average between approximately 0.09 and 0.12 micrometers.

3. The piston and cylinder assembly of claim 1, wherein the cylinder bore is made of a eutectic Al—Si alloy including other alloying elements.

4. The piston and cylinder assembly of claim 3, wherein the aluminum alloy includes, by weight, 9.5 to 12.5% silicon, 0.1 to 1.5% iron, 0.2 to 3% manganese, 0.1 to 0.6% magnesium, up to 0.05% strontium, and aluminum, wherein the weight ratio of manganese to iron is at least 1.2 when the iron content is equal to or greater than 0.4% and the weight ratio of manganese to iron is at least 0.6 when the iron content is less than 0.4% of the alloy.

5. The piston and cylinder assembly of claim 4, wherein the aluminum alloy further includes, by weight, 1.5 to 4.5% copper, 2.0% maximum zinc, 0 to 1.5% nickel, and 0.25% maximum titanium.

6. The piston and cylinder assembly of claim 1, wherein the bore surface has a reduced peak height (Rpk) between approximately 0.05 and 0.25 micrometers.

7. The piston and cylinder assembly of claim 1, wherein the bore surface has a reduced valley depth (Rvk) between approximately 0.15 and 0.40 micrometers.

8. The piston and cylinder assembly of claim 1, wherein the surface finish has a roughness total of approximately 10 micrometers and an approximate peak-to-peak distance of 0.20 millimeters within the assessment length.

9. The piston and cylinder assembly of claim 1, wherein the nickel ceramic composite (NCC) coating includes a Ni—P—BN plated coating.

10. The piston and cylinder assembly of claim 1, wherein the Ni—P—BN plated coating includes approximately 3-7% by volume boron nitride (BN) and approximately 3% by weight phosphorous (P).

11. The piston and cylinder assembly of claim 10, wherein the coating is electroplated and has suspended ceramic particulate in the electroplating solution co-deposited during electroplating, the coating has a thickness between approximately 10 and 18 micrometers and an approximate hardness between 47 and 55 HRC, and the boron nitride (BN) particulate is 4 micron in diameter and less than 1 micron in thickness.

* * * * *